United States Patent
Hird

(10) Patent No.: US 9,413,735 B1
(45) Date of Patent: Aug. 9, 2016

(54) MANAGING DISTRIBUTION AND RETRIEVAL OF SECURITY KEY FRAGMENTS AMONG PROXY STORAGE DEVICES

(71) Applicant: CA, Inc., New York, NY (US)

(72) Inventor: Geoffrey R. Hird, Cupertino, CA (US)

(73) Assignee: CA, Inc., New York, NY (US)

( * ) Notice: Subject to any disclaimer, the term of this patent is extended or adjusted under 35 U.S.C. 154(b) by 33 days.

(21) Appl. No.: 14/600,497

(22) Filed: Jan. 20, 2015

(51) Int. Cl.
 *H04L 29/06* (2006.01)

(52) U.S. Cl.
 CPC .............. *H04L 63/062* (2013.01); *H04L 63/08* (2013.01)

(58) Field of Classification Search
 CPC .................. H04L 63/062; H04L 63/08
 USPC ............................................................. 726/7
 See application file for complete search history.

(56) References Cited

U.S. PATENT DOCUMENTS

| | | | | | |
|---|---|---|---|---|---|
| 5,867,578 | A * | 2/1999 | Brickell | ............... | G06F 21/40 380/286 |
| 8,719,590 | B1 * | 5/2014 | Faibish | ............... | H04L 9/085 713/190 |
| 9,165,158 | B2 * | 10/2015 | Li | ............... | H04L 9/083 |
| 9,275,389 | B1 * | 3/2016 | Dides | ............... | G06Q 20/405 |
| 2002/0194149 | A1 * | 12/2002 | Gerber | ............... | G06F 17/30595 |
| 2003/0084290 | A1 * | 5/2003 | Murty | ............... | H04L 63/0428 713/168 |
| 2003/0120757 | A1 * | 6/2003 | Baldwin | ............... | G06Q 10/109 709/220 |
| 2004/0111379 | A1 * | 6/2004 | Hicks | ............... | G06Q 20/00 705/76 |
| 2005/0028064 | A1 * | 2/2005 | Thomas | ............... | G06F 21/83 714/752 |
| 2006/0136713 | A1 * | 6/2006 | Zimmer | ............... | H04L 63/0428 713/150 |
| 2010/0083385 | A1 * | 4/2010 | Uchida | ............... | G06F 21/606 726/30 |
| 2012/0243687 | A1 * | 9/2012 | Li | ............... | H04L 9/085 380/277 |
| 2013/0061298 | A1 * | 3/2013 | Longobardi | ............... | G06F 21/42 726/6 |
| 2013/0254856 | A1 * | 9/2013 | Krishan | ............... | G06F 21/45 726/6 |
| 2015/0089231 | A1 * | 3/2015 | Oxford | ............... | H04L 9/0869 713/171 |
| 2015/0120569 | A1 * | 4/2015 | Belshe | ............... | G06Q 20/065 705/71 |
| 2015/0262176 | A1 * | 9/2015 | Langschaedel | ...... | G06Q 20/065 705/71 |
| 2015/0304306 | A1 * | 10/2015 | Ponsford | ............. | G06F 21/6218 713/171 |
| 2015/0310436 | A1 * | 10/2015 | Lakshmanan | .......... | G06Q 20/40 705/71 |
| 2015/0348017 | A1 * | 12/2015 | Allmen | ............... | G06Q 20/367 705/76 |
| 2016/0044001 | A1 * | 2/2016 | Pogorelik | ............. | H04L 67/104 713/168 |

OTHER PUBLICATIONS

Shamir, "How to Share a Secret", *Communications of the ACM*, vol. 22, No. 11, Nov. 1979, pp. 612-613.

* cited by examiner

*Primary Examiner* — Hadi Armouche
*Assistant Examiner* — Shahriar Zarrineh
(74) *Attorney, Agent, or Firm* — Myers Bigel & Sibley, P.A.

(57) ABSTRACT

A method performed by a processor of a computer, includes obtaining a security key associated with data, dividing the security key into key fragments, and distributing different ones of the key fragments to different proxy storage devices. Key fragments are received from the proxy storage devices, a reconstructed security key is generated based on the key fragments received from the proxy storage devices, and programmatic access to the data is controlled based on the reconstructed security key. Related computer program products and systems are disclosed.

21 Claims, 5 Drawing Sheets

MANAGING DISTRIBUTION AND RETRIEVAL OF SECURITY KEY FRAGMENTS AMONG PROXY STORAGE DEVICES

BACKGROUND

The present disclosure relates to computing systems and, in particular, to management of security keys among computer systems including Bitcoin management systems.

Bitcoin is a software based peer-to-peer payment system. Bitcoins (especially personal Bitcoins) are typically stored in a digital wallet, which exists either in the cloud or on a user's computer or mobile device. The digital wallet functions as a virtual bank account that allows users to send and receive Bitcoins and make payments. However, only users' credentials for Bitcoin ownership are stored in the digital wallets. A Bitcoin payment occurs by transfer of value between Bitcoin addresses that gets recorded in a publically accessible transaction ledger (the "blockchain"), where Bitcoin address identifiers are listed.

Security of digital wallets is an increasing concern in view of hackers stealing Bitcoins due to insufficient security mechanisms for digital wallets. The most sensitive data in a digital wallet is the collection of private keys associated with the Bitcoin addresses that occur in the public blockchain. Some Bitcoin owners have resorted to dividing their Bitcoins between less secure "hot storage" residing in a network accessible digital wallet and more secure "cold storage" residing on a non-network accessible device such as a removable non-volatile memory device.

SUMMARY

Some embodiments of the present disclosure are directed to a method performed by a processor of a computer. The method includes obtaining a security key associated with data, dividing the security key into key fragments, and distributing different ones of the key fragments to different proxy storage devices. The method further includes receiving the key fragments from the proxy storage devices, generating a reconstructed security key based on the key fragments received from the proxy storage devices, and controlling programmatic access to the data based on the reconstructed security key.

Some related other embodiments are directed to a computer program product that includes a non-transitory computer readable storage medium storing computer readable program code which when executed by a processor of a computer causes the processor to perform operations including obtaining a security key associated with data, dividing the security key into key fragments, and distributing different ones of the key fragments to different proxy storage devices. The operations further include receiving the key fragments from the proxy storage devices, generating a reconstructed security key based on the key fragments received from the proxy storage devices, and controlling programmatic access to the data based on the reconstructed security key.

Other methods, computer program products, and/or systems according to embodiments of the inventive subject matter will be or become apparent to one with skill in the art upon review of the following drawings and detailed description. It is intended that all such additional methods, computer program products, and/or systems be included within this description, be within the scope of the present inventive subject matter, and be protected by the accompanying claims.

Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
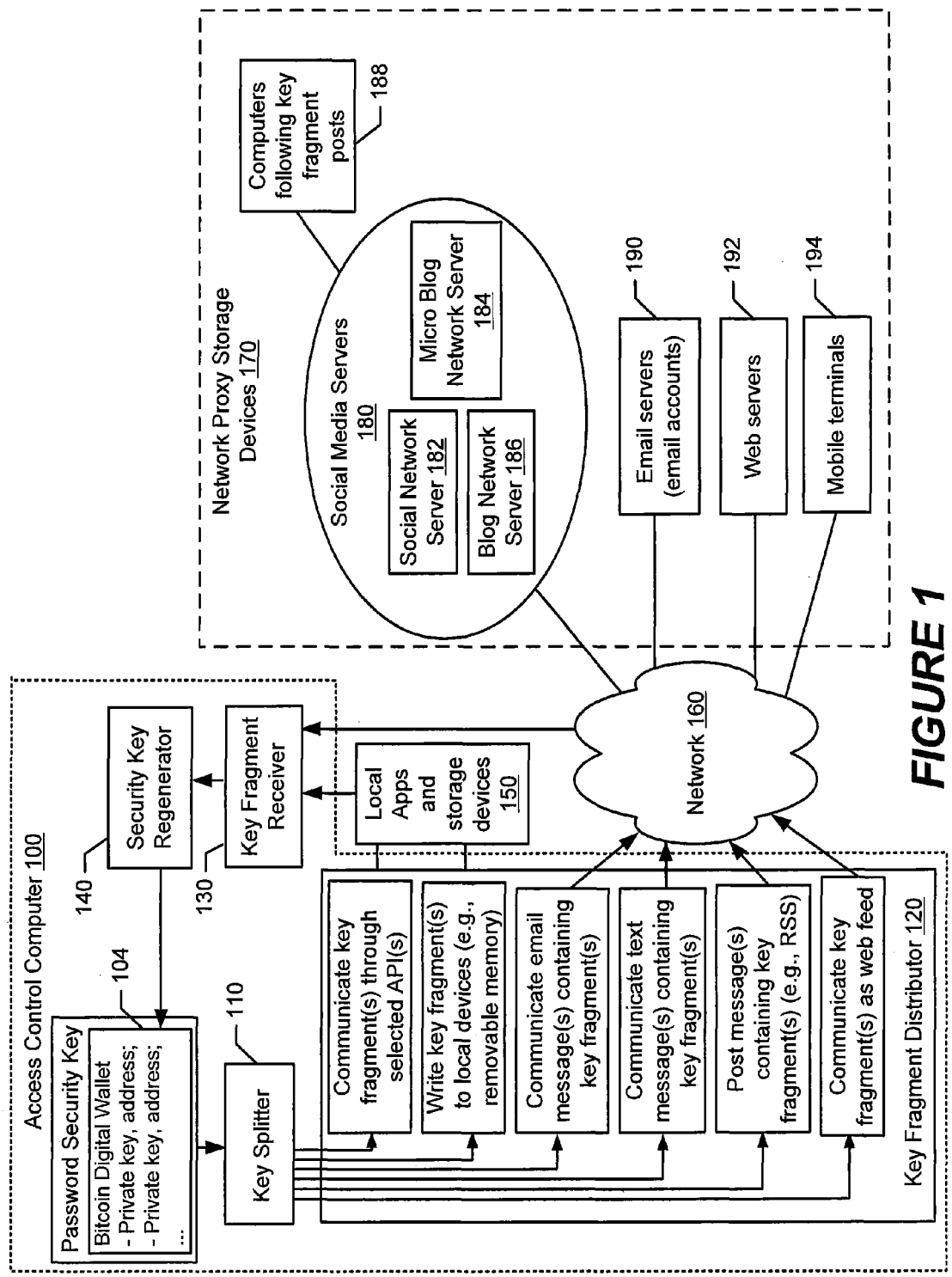
FIG. 1 is a block diagram of a system including an access control computer that distributes fragments of a security key to proxy storage devices, reconstructs the security key based on the key fragments received from the proxy storage devices, and controls programmatic access to data based on the reconstructed security key, in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Many computer systems use various forms of security keys (e.g., private key, password, etc.) to control access to data such as application program code, user information, etc. A fundamental problem is that a weak security key short enough for a human to reliably remember may be guessed or determined by brute-force (e.g., repetitive logical attempts) by an attacker. In contrast, a stronger security key increases the risk that it will be recorded by the user somewhere (whether on paper or in digital form) and the protection of the recorded format then becomes a challenge. In addition to providing data security, characteristics of a security key can affect other system operations, such as system robustness (recovery), system convenience of use, and unauthorized attempted access detection and response by the system.

When stored locally, sensitive data can be protected by encryption, under either a password or a cryptographic key. As used herein a security key refers to a cryptographic key, a password, and/or other information that can be used to control access to data.

Increased protection of a security keys may be obtained by the use of "n-of-n or n-of-m secret sharing" to split each security key into fragments that are dispersed across email accounts, social media accounts, websites, text message addresses, trusted associates, and various types of storage media, each of which may have different security processes that control access thereto. The original security keys can be regenerated responsive to receiving all or a threshold number of the key fragments from the distributed storage locations. Some approaches for n-of-m secret sharing that may be used with various embodiments of the present disclosure are described in the publication, Shamir, Adi (1979), How to share a secret, Communications of the ACM 22 (11): 612-613, the contents of which are incorporated herein by reference.

Various embodiments of the present disclosure are described in the context of controlling access to data of a Bitcoin digital wallet program, also referred to herein as a Bitcoin wallet. However, the embodiments are not limited thereto and may be applied to other systems that can benefit from improved data security. For example, access control computers disclosed herein may be used to control access to any type of data, such as application program code and/or user information accessed by application program code, including online user account information such as financial accounts, email accounts, streaming media service accounts, etc.

FIG. 1 is a block diagram of a system including an access control computer 100 configured according to some embodiments of the present disclosure. The access control computer 100 controls a user's programmatic access to a Bitcoin digital wallet 104.

Bitcoin uses public key cryptography, whereby keys are created in pairs—each pair has a private key and a public key. With Bitcoin, rather than use a public key directly, a small sequence of alphanumeric characters is derived which is called a "Bitcoin address". Each Bitcoin address is the possible destination of a Bitcoin payment, such as to a network addressable Bitcoin transaction ledger. An address functions like an account number or name and a private key functions as an ownership credential. The Bitcoin wallet 104 may securely store many pairs of addresses and private keys.

The Bitcoin wallet 104 may be encrypted by the access control computer 100 as a whole using a password security key and/or individual private keys storable within the Bitcoin wallet 104 may be encrypted separately using corresponding security keys. For example, the Bitcoin wallet 104 data can be encrypted under a password by generating a symmetric password security key from the password via a well-known mechanism such as one of the public-key cryptography standards (PKCS), e.g., PKCS #5. The data is then encrypted using the generated password security key and a corresponding algorithm, such as Advanced Encryption Standard (AES).

When a key management program manages a plurality of security keys, for each of the plurality of security keys the operations can be repeated to divide the security key into key fragments and to distribute different ones of the key fragments to different ones of the proxy storage devices 170 and/or 150. The key fragments from one of the plurality of security keys can be distributed to a group of the proxy storage devices which is selected based on the group containing at least one proxy storage device that is not within another group of the proxy storage devices that receives distribution of key fragments from another one of the plurality of security keys. Distributing key fragments of different ones of the security keys to different groups containing at least some different proxy storage devices may increase a level of security by which the collection of security keys is protected. The key splitter 110, the key fragment distributor 120, and/or the key fragment receiver 130 of the access control computer 100 may encapsulate application programming interfaces of the key management program. Providing the key fragment generation, distribution, and receiving functionality through program code that encapsulates key management program code which uses the regenerated security key, facilitates deployment of enhanced security features without necessitating modification of program code for the key management program.

Various embodiments of the present disclosure provide increased security and/or flexibility for storing and/or sharing security keys. A security key associated with data is split into key fragments, and the key fragments are then distributed across different proxy storage devices. For example, a password key, private key, and/or public key may be split into key fragments. A key splitter 110 may operate to divide a security key into key fragments. The key fragments are distributed to different proxy storage devices for storage. A key fragment distributor 120 may operate to distribute the key fragments. The key fragments can be later received from the proxy storage devices. A key fragment receiver 130 may operate to receive the key fragments. A reconstructed security key can be generated based on the key fragments received from the proxy storage devices. A security key regenerator 140 may operate to generate the reconstructed security key. Programmatic access to the data can be controlled based on the reconstructed security key. The Bitcoin wallet 104 or other program code of the access control computer 100 may operate to control access to the data.

Controlling programmatic access to the data can include attempting a login process to a user account using the reconstructed security key, attempting to decrypt previously encrypted data, etc. For example, a password may be reconstructed from the key fragments and used to attempt to obtain access to data contained in the Bitcoin wallet 104, and/or an encryption key may be may be reconstructed from the key fragments and used to attempt to decrypt individual private keys, addresses, and/or other content of the Bitcoin wallet 104. In the embodiment of FIG. 1, the access control computer 100 may decrypt the Bitcoin wallet 104 or a private key therein based on the reconstructed security key matching the original security key. Alternatively or additionally, when the security key is a password for a user account, the access control computer 100 may grant user access to the user account via a user interface program based on the reconstructed security key matching the password for the user account.

Figure 2:
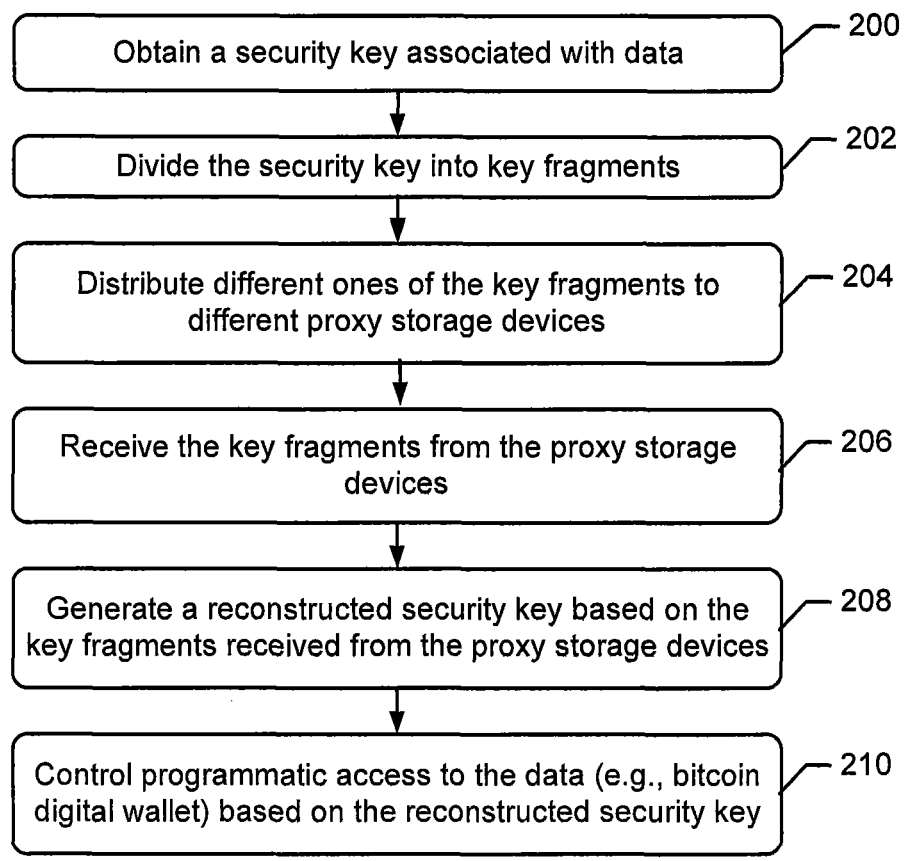
FIGS. 2-4 are flowcharts of operations that may be performed by an access control computer configured according to some embodiments of the present disclosure.

FIG. 2 is a flowchart of operations that may be performed by these and/or other components of the access control computer 100. A security key associated with data is obtained (block 200). The security key is divided (block 202) into key fragments. Different ones of the key fragments are distributed (block 204) to different proxy storage devices. The key fragments are separately received (block 206) from the proxy storage devices. The reconstructed security key is generated (block 208) based on the key fragments received from the proxy storage devices. Programmatic access to the data (e.g., the Bitcoin digital wallet 104) is controlled (block 210) based on the reconstructed security key.

Multiple key fragments may be distributed to a same proxy storage device which is determined to provide at least a threshold level of security. For example, the levels of security provided by the proxy storage devices for storage of key fragments can be determined. A subset of the proxy storage devices can be selected for storage of the key fragments based on the levels of security, and the key fragments can be distributed to the subset of the proxy storage devices for storage. In this manner, some proxy storage devices that are determined to have less than the threshold level of security, based on user defined parameters and/or defined rules, may not be selected for storage of key fragments or may be selected for storage of only a single key fragment each. In contrast, some other proxy storage devices that have at least the threshold level of security may be selected for storage of one or more key fragments.

These and other operations of the access control computer 100 and other components of the system of FIG. 1 are explained in more detail below.

The proxy storage devices may include local applications and storage devices 150 which can include application programs processed by a same computer component as the access control computer 100 and/or removable memory devices (e.g., USB storage devices). The proxy storage devices may alternatively or additionally include network proxy storage devices 170 which are communicatively connected to the access control computer 100 via a data network 160 (e.g., a public network such as the Internet, and/or a private network). The network proxy storage devices 170 can include, but are not limited to, social media servers 180, email servers 190, web page servers 192, and/or mobile terminals 194.

The social media servers 180 may include a social network server 182 (e.g., Facebook™), a blog network server 186 (e.g., Tumblr™, server providing Web2.0 Properties/Networks, etc.), a micro blog network server 184 (e.g., Twitter™), and/or another type of social media server. A social media server 180 receives a message containing a key fragment and a message string from the key fragment distributor 120, and publishes the message for receipt by one or more computers 188 who have registered with the social media server 180 to track publishing of messages on the social media server 120 containing a defined message string. The message string may correspond to a username used for the Bitcoin wallet 104, an identifier associated with the access control computer 100, and/or a string of characters that is defined by a user and which is defined as being tracked by an intended recipient computer 188.

In the embodiment of FIG. 1, a key splitter 110 divides a security key into any plural number of key fragments. The key splitter 110 may utilize a "n-of-m" secret sharing algorithm to split the security key into m different key fragments, which enables a security key regenerator to reconstruct the security key from a fewer number n (e.g., n=m−1) of the key fragments received from the proxy storage devices. For example, using a 4-of-5 secret sharing algorithm, a security key is divided into 5 different key fragments that are distributed to 5 different proxy storage devices for storage. The security key regenerator 140 can regenerate the original security key so long as at least 4 of the key fragments are received back from those proxy storage devices.

The key splitter 110 may be configured to form different groups of the proxy storage devices 170 associated with different ones of a plurality of security keys. The key splitter 110 may select one of the groups of proxy storage devices 170 based on the security key obtained matching a security key associated with the selected one of the groups of proxy storage devices. A number of the proxy storage devices 170 in the selected one of the groups can be determined and used by the key splitter 110 to control a number of the key fragments generated from a security key based on the number of the proxy storage devices 170 in the selected one of the groups of proxy storage devices 170. Which of the proxy storage devices 170 are members of which of the groups may be defined by a user and/or defined by one or more defined rules based on characteristics of the proxy storage devices 170 which, for example, seek to store the key fragments using a threshold number of different types of access security mechanisms provided by the various proxy storage devices 170.

Figure 3:
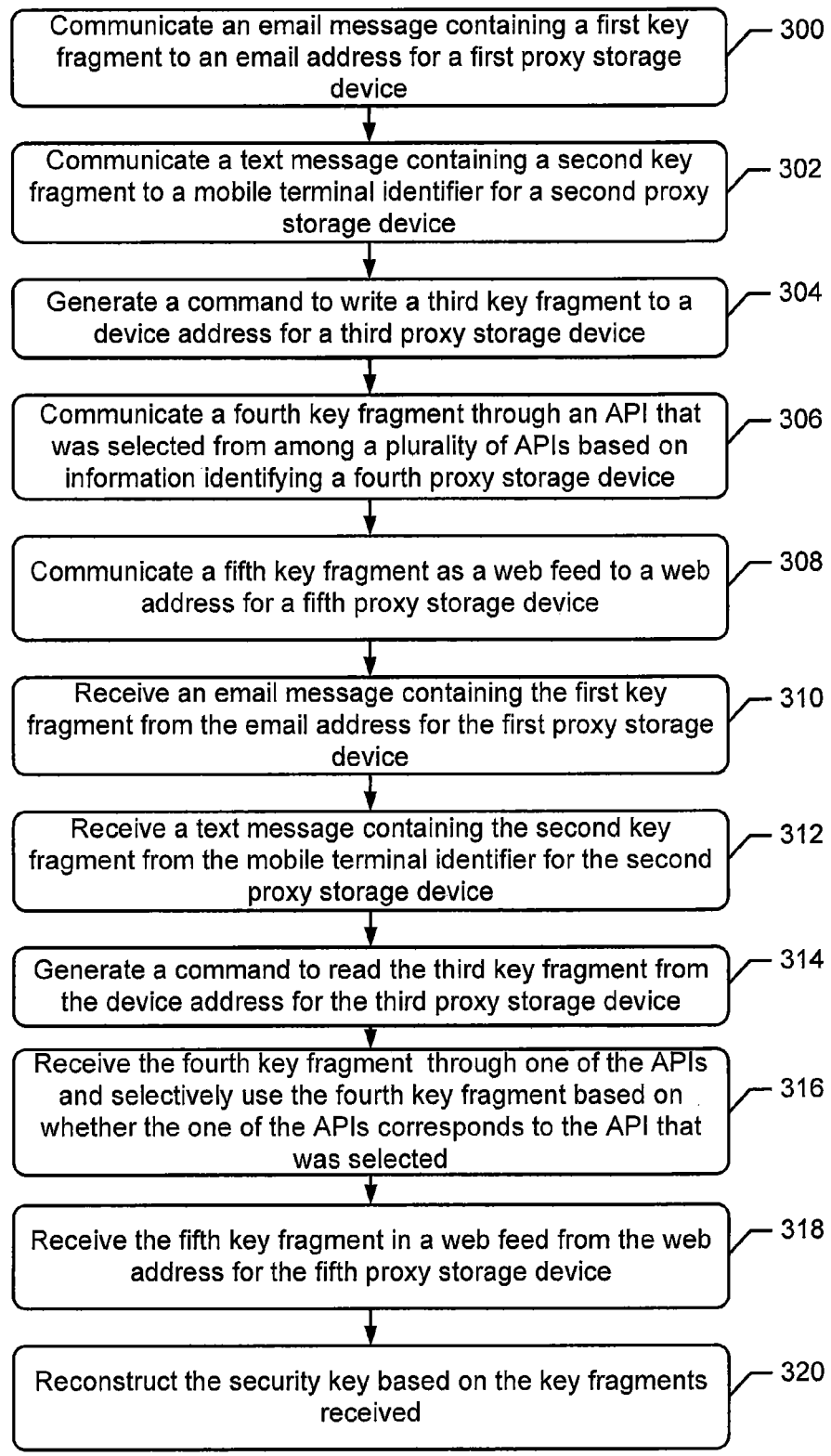

The key fragment distributor 120 distributes different ones of the key fragments to selected ones of the proxy storage devices 170. FIG. 3 is a flowchart of operations that may be performed by the key fragment distributor 120 and the key fragment receiver 130 according to some embodiments.

The key fragment distributor 120 receives the key fragments from the key splitter 110, and distributes the key fragments to a plurality of the proxy storage devices. The distributor 120 determines an email address for an email account hosted by one of the email servers 190, and communicates (block 300) an email message containing one of the key fragments ("first key fragment") with the email address. The distributor 120 determines a mobile terminal identifier for one of the mobile terminals 194, and communicates (block 302) a text message containing another one of the key fragments ("second key fragment") with the mobile terminal identifier. The distributor 120 determines a device address of one of the local application and/or storage devices 150 having a direct non-network connection to the security computer (e.g., the access control computer 100), and generates (block 304) a command to write another one of the key fragments ("third key fragment") to the device address. The distributor 120 selects an application programming interface (API) from among a plurality of APIs based on information identifying one of the proxy storage devices 170 and/or 150, and communicates (block 306) another one of the key fragments ("fourth key fragment") through the API that was selected. The distributor 120 determines a web address for one of the web servers 192, and communicates (block 308) another one of the key fragments ("fifth key fragment") as a web feed with the web address.

The key fragment receiver 130 receives key fragments from the different proxy storage devices. A security key regenerator 140 reconstructs the security key using the key fragments from the key fragment receiver 130. The security key regenerator 140 may be configured to reconstruct the security key from less than all of the key fragments that were generated by the key splitter 110 from the security key. When the security key regenerator 140 receives a threshold number of the key fragments, which can be less than all of the key fragments generated by the key splitter 110, the security key regenerator 140 can regenerate the original security key. The security key regenerator 140 may attempt to regenerate and verify the regenerated security key for correctness upon receipt of each key fragment from various ones of the proxy storage devices, and upon successful verification output the regenerated security key for use in controlling access to the data.

Continuing with the example of FIG. 3, the key fragment receiver 130 receives (block 310) an email message from the email address for the user account hosted by the email server 190, and obtains the first key fragment from the email message. The key fragment receiver 130 receives (block 312) a text message containing the second key fragment. The key fragment receiver 130 generates (block 314) a command to read the third key fragment from the device address for the local application and/or the storage device 150 having a direct non-network connection to the security computer (e.g., the access control computer 100). The key fragment receiver 130 receives (block 316) the fourth key fragment through an API and selectively uses the fourth key fragment based on whether the API through which it was received corresponds to the API that was selected (block 306) for indication of the fourth key fragment. The key fragment receiver 130 receives (block 318) the fifth key fragment in a web feed from the web address for the web server 192 to which the fifth key fragment was communicated (block 308). The security key regenerator 140 reconstructs (block 320) the security key based on the first, second, third, fourth, and fifth key fragments.

When a key fragment is stored in a user account on an email server 190, access to the key fragment can be controlled based on a secure user ID and password received from the user and/or from the key fragment receiver 130. When a key fragment is stored on a web server 192 at a defined URI, access to the key fragment can be controlled based on a secure user ID and password received from the user and/or from the key fragment receiver 130. When a key fragment is sent via text messaging (e.g., SMS), the receiving mobile terminal 194 can control access to the stored key fragment via a security program layer processed by the mobile terminal 194 (e.g., screen-lock functionality). Accordingly, increased protection of the security key can be obtained by splitting the security key into fragments that are dispersed across a plurality of different locations and types of proxy storage devices each having local security processes that control access to the respective locally stored key fragments.

Figure 4:
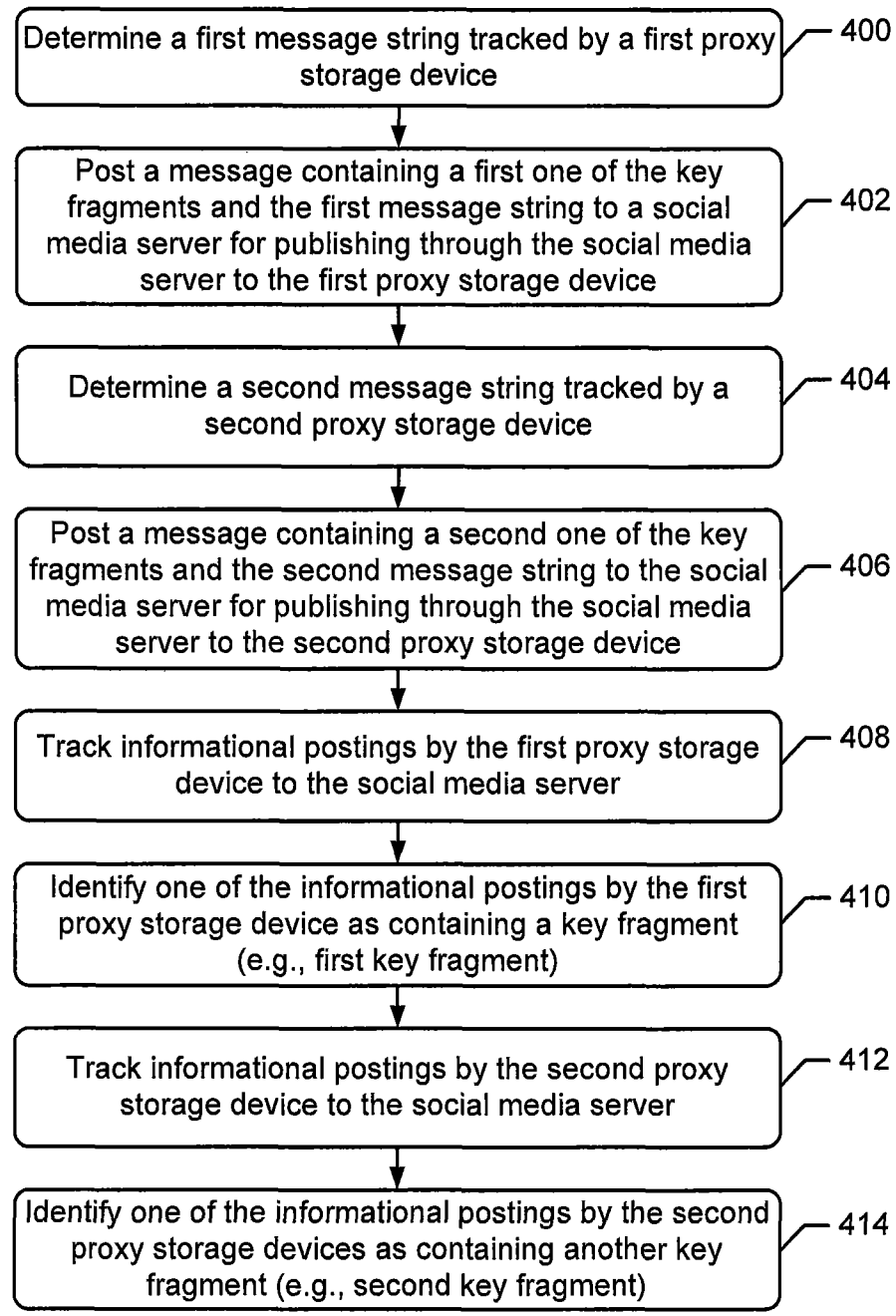

Key fragments may additionally or alternatively be stored on one or more of the social media servers 180. When communicated to a social media server 180, the key fragment can be stored in a private area having secured user ID and password controlled access. Referring to the flowchart of example operations shown in FIG. 4, the key fragment distributor 120 determines (block 400) a first message string tracked by a first computer 188 on one of the social media servers 180 (e.g., a social network server 182), and posts (block 402) a message containing one of the key fragments ("first key fragment") and the message string to the social media server 180 for publishing through the social media server 180 to the first computer 188. Similarly, the key fragment distributor 120 determines (block 404) a second message string tracked by a second computer 188 on the same or another one of the social media servers 180 (e.g., a micro blog network server 184), and posts (block 406) a message containing another one of the key fragments ("second key fragment") and the message string to the social media server 180 for publishing through the social media server 180 to the second computer 188.

When determining the first and second message strings (block 400 and 404), the key fragment distributor 120 may select the message strings from among a plurality of defined message strings that identify different groupings of messages published by the social media servers 180 that can be separately tracked by the computers 188. Thus, for example, the first message string can be selected based on it being defined as tracked by the first computer, so that the first computer will receive and locally store the first key fragment. Similarly, the second message string can be selected based on it being defined as tracked by the second computer, so that the second computer will receive and locally store the second key fragment. The first and/or second computers may fetch the respective first and second key fragments from respective user accounts on the social media servers 180 and/or may receive the key fragments in one or more communications pushed to the respective computers from the social media servers 180.

The key fragment receiver 130 may receive the first key fragment by tracking (block 408) informational postings by the first computer 188 to one of the social media servers 180 (e.g., the social network server 182), and identifying (block 410) one of the informational postings by the first computer 188 as containing the first key fragment. Similarly, the key fragment receiver may receive the second key fragment by tracking (block 412) informational postings by the second computer 188 to one of the social media servers 180 (e.g., the micro blog network server 184), and identifying (block 414) one of the informational postings by the second computer 188 as containing the second key fragment.

In this manner, increased security and/or flexibility for storing and/or sharing security keys can be obtained.

Example Access Control Computer

Figure 5:
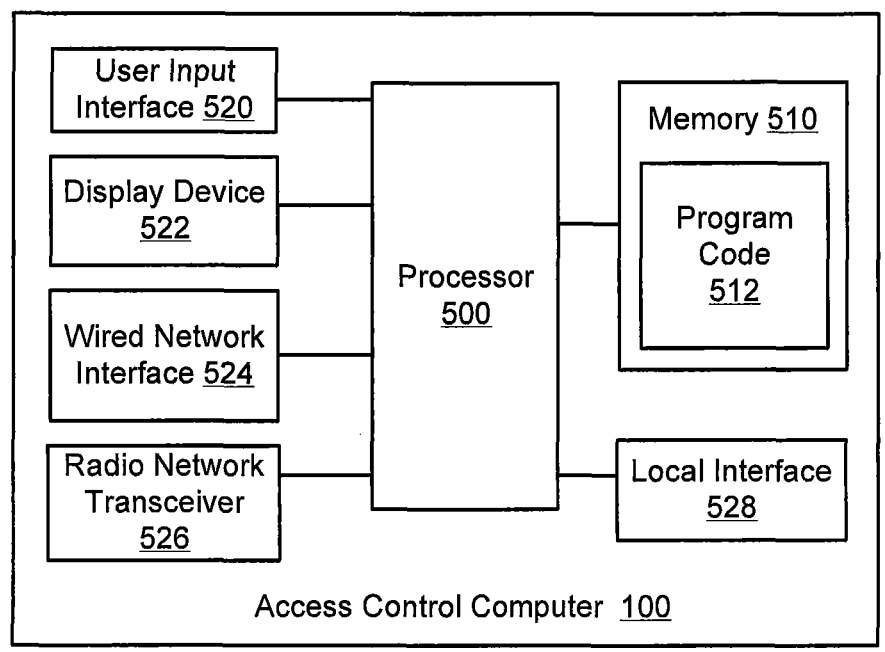
FIG. 5 is a block diagram of an access control computer according to some embodiments of the present disclosure.

FIG. 5 is a block diagram of an access control computer 100 according to some embodiments of the present disclosure. Referring to FIG. 5, the access control computer 100 includes a processor 500, a memory 510, and a network interface which may include a radio access network transceiver 526 and/or a wired network interface 524 (e.g., Ethernet interface). The radio access network transceiver 526 can include, but is not limited to, a LTE or other cellular transceiver, WLAN transceiver (IEEE 802.11), WiMax transceiver, or other radio communication transceiver configured to communicate with the network proxy storage devices 170 via a radio access network which may form part of the network 160.

The processor 500 may include one or more data processing circuits, such as a general purpose and/or special purpose processor (e.g., microprocessor and/or digital signal processor) that may be collocated or distributed across one or more networks. The processor 500 is configured to execute computer program code 512 in the memory 510, described below as a non-transitory computer readable medium, to perform at least some of the operations described herein as being performed by an access control computer. The computer program code 512 when executed by the processor 500 causes the processor 500 to perform operations in accordance with one or more embodiments disclosed herein for the access control computer 100. The access control computer 100 may further include a user input interface 520 (e.g., touch screen, keyboard, keypad, etc.) and a display device 522.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of a computer:
obtaining a security key associated with data;
dividing the security key into key fragments;
distributing different ones of the key fragments to different proxy storage devices, wherein the obtaining a security key associated with data, the dividing the security key into key fragments, and the distributing different ones of the key fragments to different proxy storage devices are performed by program code that encapsulates application programming interfaces of the key management program;
receiving the key fragments from the proxy storage devices;
generating a reconstructed security key based on the key fragments received from the proxy storage devices;
controlling programmatic access to the data based on the reconstructed security key,
wherein the obtaining a security key associated with data, comprises obtaining a plurality of security keys managed by a key management program; and
further comprising repeating for each of the plurality of security keys, the dividing the security key into key fragments and the distributing different ones of the key fragments to different proxy storage devices, wherein the key fragments from one of the plurality of security keys are distributed to a group of the proxy storage devices selected based on the group containing at least one proxy storage device that is not within another group of the proxy storage devices that receives distribution of key fragments from another one of the plurality of security keys.

2. The method of claim 1, further comprising:
forming different groups of proxy storage devices associated with different security keys;
selecting one of the groups of proxy storage devices based on the security key obtained matching a security key associated with the selected one of the groups of proxy storage devices; and
determining a number of the proxy storage devices in the selected one of the groups,
wherein the dividing the security key into key fragments, comprises controlling a number of the key fragments generated by the dividing based on the number of the proxy storage devices in the selected one of the groups of proxy storage devices.

3. The method of claim 1, further comprising:
determining levels of security provided by the proxy storage devices for storage of key fragments; and
selecting a subset of the proxy storage devices for storage of the key fragments based on the levels of security,
wherein the key fragments are distributed to the subset of the proxy storage devices for storage.

4. The method of claim 1, wherein:
the distributing different ones of the key fragments to different proxy storage devices, comprises:
determining an email address for one of the proxy storage devices; and
communicating an email message containing one of the key fragments with the email address for the one of the proxy storage devices; and
the receiving the key fragments from the proxy storage devices, comprises:
receiving an email message from the email address for the one of the proxy storage devices; and
obtaining the one of the key fragments from the email message.

5. The method of claim 1, wherein:
the distributing different ones of the key fragments to different proxy storage devices, comprises:
determining a mobile terminal identifier for one of the proxy storage devices; and
communicating a text message containing one of the key fragments with the mobile terminal identifier for the one of the proxy storage devices; and
the receiving the key fragments from the proxy storage devices, comprises:
receiving a text message from the mobile terminal identifier for the one of the proxy storage devices; and
obtaining the one of the key fragments from the text message.

6. The method of claim 1, wherein:
the distributing different ones of the key fragments to different proxy storage devices, comprises:
determining a device address of one of the proxy storage devices having a direct non-network connection to the security computer; and
generating a command to write one of the key fragments to the device address for the one of the proxy storage devices; and
the receiving the key fragments from the proxy storage devices, comprises:
generating a command to read the one of the key fragments from the device address for the one of the proxy storage devices.

7. The method of claim 1, wherein the distributing different ones of the key fragments to different proxy storage devices, comprises:
selecting an application programming interface (API) from among a plurality of APIs based on information identifying one of the proxy storage devices; and
communicating one of the key fragments through the API that was selected.

8. The method of claim 7, wherein the receiving the key fragments from the proxy storage devices, comprises:
receiving the one of the key fragments through one of the APIs; and
selectively using the one of the key fragments received through one of the APIs based on whether the one of the APIs corresponds to the API that was selected.

9. The method of claim 1, wherein the distributing different ones of the key fragments to different proxy storage devices, comprises:
determining a message string tracked by one of the proxy storage devices; and
posting a message containing one of the key fragments and the message string to a social media server for publishing through the social media server to the one of the proxy storage devices.

10. The method of claim 9, wherein the distributing different ones of the key fragments to different proxy storage devices, further comprises:
determining another message string tracked by another one of the proxy storage devices; and
posting a message containing another one of the key fragments and the another message string to the social media server for publishing through the social media server to the another one of the proxy storage devices.

11. The method of claim 10, wherein the determining a message string tracked by one of the proxy storage devices and the determining another message string tracked by another one of the proxy storage devices, comprises:
  selecting the message string and the another message string from among a plurality of defined message strings that identify different groupings of messages published by the social media server that can be separately tracked by the proxy storage devices.

12. The method of claim 10, wherein the receiving the key fragments from the proxy storage devices, comprises:
  tracking informational postings by the one of the proxy storage devices to the social media server;
  identifying one of the informational postings by the one of the proxy storage devices as containing the one of the key fragments;
  tracking informational postings by the another one of the proxy storage devices to the social media server; and
  identifying one of the informational postings by the another one of the proxy storage devices as containing the another one of the key fragments.

13. The method of claim 1, wherein:
  the distributing different ones of the key fragments to different proxy storage devices, comprises:
    determining a web address for one of the proxy storage devices; and
    communicating one of the key fragments as a web feed with the web address for the one of the proxy storage devices; and
  the receiving the key fragments from the proxy storage devices, comprises:
    receiving the one of the key fragments in a web feed from the web address for the one of the proxy storage devices.

14. The method of claim 1, wherein:
  the obtaining a security key associated with data, comprises:
    obtaining a password for a user account; and
  the controlling programmatic access to the data based on the reconstructed security key, comprises:
    granting user access to the user account via a user interface program based on the reconstructed security key matching the password for the user account.

15. The method of claim 1, wherein the controlling programmatic access to the data based on the reconstructed security key, comprises:
  decrypting data using the reconstructed security key.

16. The method of claim 1, wherein the security key comprises a private key associated with an address to a network addressable Bitcoin transaction ledger.

17. A computer program product, comprising:
  a non-transitory computer readable storage medium storing computer readable program code which when executed by a processor of a computer causes the processor to perform operations comprising:
    obtaining a security key associated with data;
    dividing the security key into key fragments;
    distributing different ones of the key fragments to different proxy storage devices, wherein the obtaining a security key associated with data, the dividing the security key into key fragments, and the distributing different ones of the key fragments to different proxy storage devices are performed by program code that encapsulates application programming interfaces of the key management program;
    receiving the key fragments from the proxy storage devices;
    generating a reconstructed security key based on the key fragments received from the proxy storage devices; and
    controlling programmatic access to the data based on the reconstructed security key,
  wherein the obtaining a security key associated with data, comprises obtaining a plurality of security keys managed by a key management program; and
  further comprising repeating for each of the plurality of security keys, the dividing the security key into key fragments and the distributing different ones of the key fragments to different proxy storage devices, wherein the key fragments from one of the plurality of security keys are distributed to a group of the proxy storage devices selected based on the group containing at least one proxy storage device that is not within another group of the proxy storage devices that receives distribution of key fragments from another one of the plurality of security keys.

18. The computer program product of claim 17, wherein:
  the distributing different ones of the key fragments to different proxy storage devices, comprises:
    determining an email address for one of the proxy storage devices;
    communicating an email message containing one of the key fragments with the email address for the one of the proxy storage devices;
    determining a mobile terminal identifier for another one of the proxy storage devices; and
    communicating a text message containing another one of the key fragments with the mobile terminal identifier for the another one of the proxy storage devices; and
  wherein the receiving the key fragments from the proxy storage devices, comprises:
    receiving an email message from the email address for the one of the proxy storage devices;
    obtaining the one of the key fragments from the email message;
    receiving a text message from the mobile terminal identifier for the another one of the proxy storage devices; and
    obtaining the one another one of the key fragments from the text message.

19. The computer program product of claim 17, wherein:
  the distributing different ones of the key fragments to different proxy storage devices, further comprises:
    determining a message string tracked by one of the proxy storage devices;
    posting a message containing one of the key fragments and the message string to a social media server for publishing through the social media server to the one of the proxy storage devices;
    determining another message string tracked by another one of the proxy storage devices; and
    posting a message containing another one of the key fragments and the another message string to the social media server for publishing through the social media server to the another one of the proxy storage devices; and
  the receiving the key fragments from the proxy storage devices, comprises:
    tracking informational postings by the one of the proxy storage devices to the social media server;
    identifying one of the informational postings by the one of the proxy storage devices as containing the one of the key fragments;

tracking informational postings by the another of the proxy storage devices to the social media server; and identifying one of the informational postings by the another of the proxy storage devices as containing the another one of the key fragments.

20. The computer program product of claim 17, wherein the controlling programmatic access to the data based on the reconstructed security key, comprises:

decrypting data using the reconstructed security key.

21. The computer program product of claim 17, wherein the security key comprises a private key associated with an address to a network addressable Bitcoin transaction ledger.

* * * * *